(12) United States Patent
Fleming et al.

(10) Patent No.: US 6,716,488 B2
(45) Date of Patent: Apr. 6, 2004

(54) FERRITE FILM FORMATION METHOD

(75) Inventors: Debra Anne Fleming, Berkeley Heights, NJ (US); Gideon S. Grader, Haifa (IL); David Wilfred Johnson, Jr., Bedminster, NJ (US); John Thomson, Jr., Spring Lake, NJ (US); Robert Bruce Van Dover, Maplewood, NJ (US)

(73) Assignee: Agere Systems Inc., Allentown, PA (US)

( * ) Notice: Subject to any disclaimer, the term of this patent is extended or adjusted under 35 U.S.C. 154(b) by 38 days.

(21) Appl. No.: 09/887,938

(22) Filed: Jun. 22, 2001

(65) Prior Publication Data

US 2003/0003324 A1 Jan. 2, 2003

(51) Int. Cl.$^7$ .................................................. H01F 1/00
(52) U.S. Cl. ....................... 427/547; 427/128; 427/130; 427/131; 427/132; 427/240; 427/241; 427/346; 427/347; 427/372.2; 427/404; 427/548; 427/598; 427/599
(58) Field of Search ................................. 427/128, 130, 427/131, 132, 240, 241, 346, 347, 547, 548, 598, 599, 372.2, 404

(56) References Cited

U.S. PATENT DOCUMENTS

| | | | |
|---|---|---|---|
| 4,477,319 A | | 10/1984 | Abe et al. |
| 4,816,292 A | | 3/1989 | Machida |
| 4,837,046 A | | 6/1989 | Oishi et al. |
| 5,393,584 A | * | 2/1995 | Satoh et al. .................. 428/64 |
| 5,728,421 A | | 3/1998 | Gyorgy et al. |
| 5,772,797 A | | 6/1998 | Nakanishi et al. |
| 5,804,250 A | * | 9/1998 | Yang ........................... 427/130 |
| 6,110,609 A | | 8/2000 | Hiramoto et al. |

OTHER PUBLICATIONS

C. M. Williams et al., "The Magnetic and Structural Properties of Ferrite Plated NiZn–Ferrite Films", IEEE Transactions on Magnetics, vol. 30, No. 6, Nov. 1994, pp. 4896–4899.

P. J. van der Zaag et al., "The Permeability of Plated Ferrite Films", IEEE Transactions on Magnetics, vol. 35, No. 5, Sep. 1999, pp. 3436–3438.

Y. Kitamoto et al., "Low–Temperature Fabrication of Co Ferrite Thin Films with High Coercivity for Perpendicular Recording Disks by Wet Process", Journal of Magnetism and Magnetic Materials, vol. 193, 1999, pp. 97–100, (no month avail.).

F. Zhang et al., "Effect of Ni Addition into Co Ferrite Thin Films for Perpendicular Recording Media", Journal of Applied Physics, vol. 87, No. 9, May 1, 2000, pp. 6881–6883.

Y. Kitamoto et al., "Intergranular Coupling and Activation Volume of Co–Ni Ferrite Thin Films with High Coercivity Above 3 kOe", IEEE Transactions on Magnetics, vol. 35, No. 5, Sep. 1999, pp. 2694–2696.

(List continued on next page.)

Primary Examiner—Bernard Pianalto
(74) Attorney, Agent, or Firm—Stroock & Stroock & Lavan LLP

(57) ABSTRACT

A ferrite layer formation process that may be performed at a lower temperature than conventional ferrite formation processes. The formation process may produce highly anisotropic structures. A ferrite layer is deposited on a substrate while the substrate is exposed to a magnetic field. An intermediate layer may be positioned between the substrate and the ferrite to promote bonding of the ferrite to the substrate. The process may be performed at temperatures less than 300° C. Ferrite film anisotropy may be achieved by embodiments of the invention in the range of about 1000 dyn-cm/cm$^3$ to about 2×10$^6$ dyn-cm/cm$^3$.

25 Claims, 2 Drawing Sheets

OTHER PUBLICATIONS

Masanori Abe et al., "Ferrite Plating in Aqueous Solution: New Technique for Preparing Magnetic Thin Film", Journal of Applied Physics, vol. 55, No. 6, Mar. 15, 1984, pp. 2614–2616.

K. C. Yoo et al., "Spin–spray Plating of Spinel Ferrite Films on Semiconductor Substrates", SPIE, vol. 1307, 1990, pp. 134–142, (no month avail.).

M. Abe et al., "Plating of Ferrite Film on 8" Disc at 70° C. by "Spray–Spin–Coating" Method", IEEE, 1987, pp. 3432–3434, (no month avail.).

V. Korenivski et al., Magnetic Film Inductors for Radio Frequency Applications, Journal of Applied Physics, vol. 82, No. 9, Nov. 1, 1997, pp. 1–8.

S. Venzke et al., "Epitaxial Growth and Magnetic Behavior of $NiFe_2O_4$ Thin Films", J. Mater. Res., vol. 11, No. 5, May 1996, pp. 1187–1198.

Masanori Abe, "A Soft Solution Processing Technique for Preparing Ferrite Films and Their Applications", Mrs Bulletin, Sep. 2000, pp. 51–55.

J. Smit et al., "Ferrites: Physical Properties of Ferrimagnetic Oxides in Relation to Their Technical Applications", John Wiley & Sons, 1959, p. 158, (no month avail).

* cited by examiner

FERRITE FILM FORMATION METHOD

FIELD OF THE INVENTION

The invention relates to formation of ferrite layers having application in micro-electronic device manufacturing, and more particularly to spin-spray processes for ferrite film fabrication.

BACKGROUND OF THE INVENTION

Conventional ferrite film fabrication techniques include sputtering, vacuum evaporation, molecular beam epitaxy and liquid phase epitaxy. While the correct chemistry can be obtained at close to ambient temperatures, formation of the desired crystaline phases using these techniques requires temperatures as high as 1000° C. Some substrates, such as GaAs and plastics, may not withstand such high temperatures. Silicon-based integrated circuits often do not permit temperatures above 400° C. for processes applied after the devices are fully formed. Ferrite films have also been formed by spraying an aqueous oxidizing agent solution on a substrate and simultaneously supplying an aqueous reaction solution containing ferrous ions to effect a crystallization reaction on the substrate. Such processes have been performed at temperatures below 100° C. These spray techniques, however, generally do not provide adequate in-plane anisotropy.

In addition to these temperature issues, bulk ferrites typically have ferromagnetic resonance frequencies in the range of 100 to 300 MHz, limiting their use to devices operating below these relatively low frequencies. Beyond the ferromagnetic resonance frequency, the material can no longer respond to a magnetic field. Accordingly, above this frequency an inductive device can no longer act as an inductor.

It is known that increased anisotropy in the film plane may increase ferromagnetic resonance frequency, thereby allowing operation at higher frequencies. Uniaxial anisotropy has been generated by crystallizing sputtered or vapor deposited amorphous films. The crystallization is typically promoted by heat treating the film in a magnetic field. These methods, however, usually require temperatures of between 350° C. and 650° C., thereby restricting their use to substrates and devices not adversely affected by temperatures in this range. Consequently, applications of such techniques are limited.

Accordingly, there is a need for a low temperature ferrite formation process, that preferably produces a highly anisotropic structure.

SUMMARY OF THE INVENTION

Embodiments of the invention provide a ferrite layer formation process that may be performed at a lower temperature than conventional ferrite formation processes. The formation process may produce highly anisotropic structures.

According to embodiments of the invention, a ferrite layer is deposited on a substrate while the substrate is exposed to a magnetic field. The process is particularly applicable to spin coating processes. In an illustrative embodiment of the invention the magnetic field is in the plane of the substrate. An intermediate layer may be positioned between the substrate and the ferrite to promote bonding of the ferrite to the substrate. Advantageously, the process may be performed at temperatures less than 300° C., and even more advantageously at temperatures below 100° C.

In-plane uniaxial ferrite film anisotropy may be achieved by embodiments of the invention in the range of about 1000 dyn-cm/cm$^3$ to about 2×10$^6$ dyn-cm/cm$^3$.

DESCRIPTION OF THE DRAWINGS

The invention is best understood from the following detailed description when read with the accompanying drawings.

DETAILED DESCRIPTION OF THE INVENTION

According to embodiments of the invention, a ferrite film is formed on a substrate wherein the substrate is exposed to a magnetic field during the deposition. As used herein, the term "film" and "layer" do not imply any particular thickness and do not limit the material to any thickness. Preferably the magnetic field is substantially uniform on the substrate. Substrate spinning may improve thickness uniformity of the ferrite layer, and may also rinse excess oxide particles away from the substrate surface. Advantageously, the formation process may be performed at temperatures less than about 300° C. Performing the formation process at less than about 100° C., is particularly advantageous given the current technology and process applications which may utilize aqueous solutions. For aqueous solutions, temperatures above 100° C. demand a pressurized chamber to prevent boiling. It should be noted that embodiments of the invention include ferrite film formation at other than atmospheric pressure whether or not aqueous solutions are used.

The ferrite film may be used in the fabrication of inductive devices operating at high frequency, such as devices having wireless applications. More particularly, small inductors may be formed directly on a semiconductor chip for use in power management or wireless signal processing. Microelectronic devices, including but not limited to, semiconductor devices having operating frequencies in a range of about 100 MHz to about 3 GHz may be fabricated using ferrite films formed according to embodiments of the invention. An exemplary operating frequency range is about 1 GHz to about 3 GHz. The operating frequency, however, may be lower than the ferromagnetic resonance (FMR) frequency. For example, to operate at 2 GHz, an FMR frequency of about 3 GHz would be required, implying an anisotropy field of 230 Oe, and the corresponding rotational permeability would be only $\mu_{rot}$×23 With even this low permeability a fairly thick film (for example, 5 $\mu$m) could roughly double the inductance of a 50 $\mu$m wide Cu stripe inductor. Illustrative FMR frequency ranges are about 1 GHz to about 3 GHz, and about 1 GHz to about 2 GHz.

Embodiments of the invention may be used to deposit crystalline ferrite films on various substrate materials. Preferably deposition is at low temperatures such as about 100° C. or less. The process depends on the controlled atomization of an aqueous oxidizing solution and an aqueous chloride solution of metal cations sprayed sequentially on the surface of a rotating, heated substrate. The aqueous oxidizing and chloride solutions are preferably preheated prior to atomization. The metal ions are oxidized and form a crystalline film on the substrate.

Figure 1:
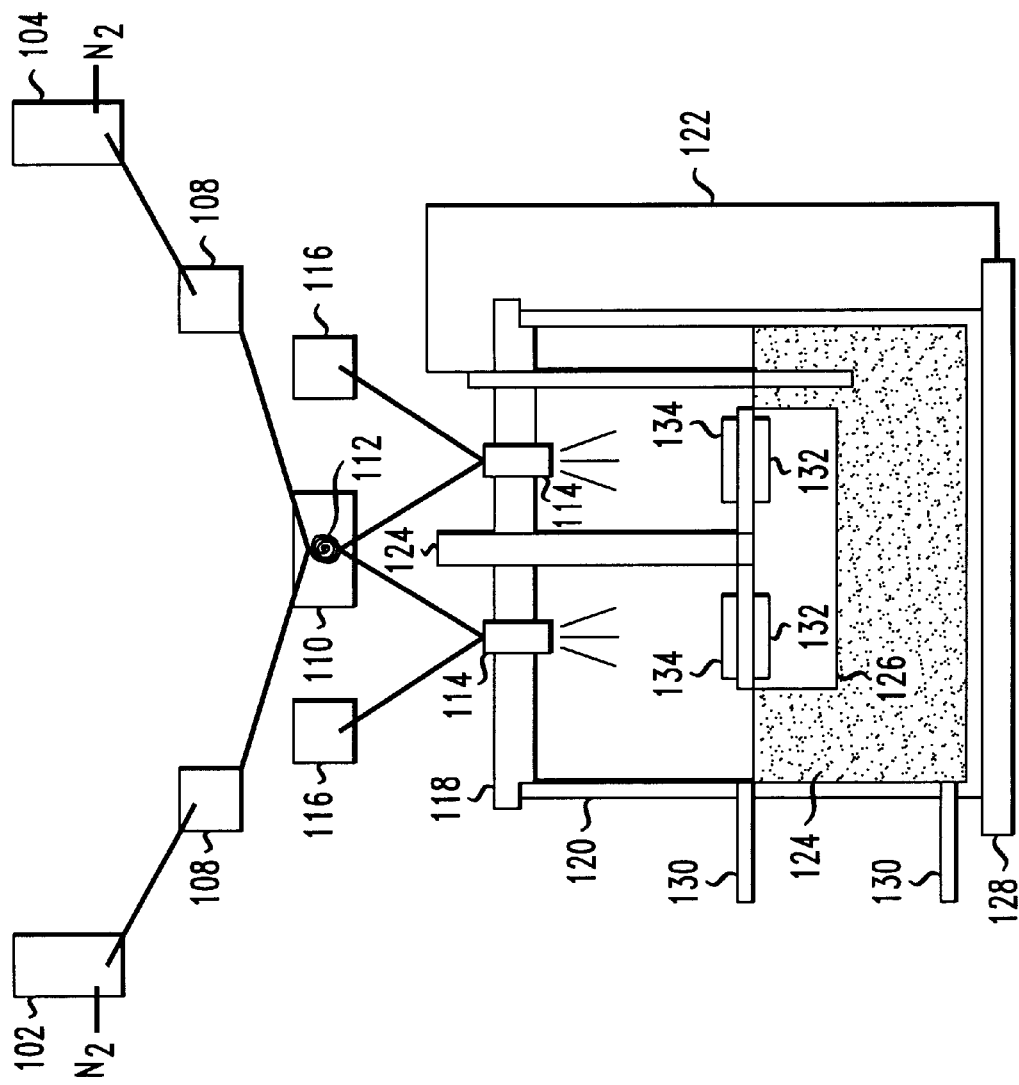
FIG. 1 is a schematic of a deposition system according to an illustrative embodiment of the invention.

FIG. 1 is a schematic of an illustrative deposition system according to an embodiment of the invention, and following is an exemplary use of the deposition system. A four liter oxidizing solution containing 30.0 grams of Na or $NH_4$ acetate (preferred buffer solution) and one gram of $NaNO_2$ is prepared and held in container 102. Similarly, a four liter solution containing $FeCl_2$ (9.0 g.), $NiCl_2$ $6H_2O$ (3.0 g.), $ZnCl_2$ (0.065 g.) and $CoCl_2$ $6H_2O$ (0.12 g.) is also prepared and held in container 104. Bubbled nitrogen may be used in both containers 102, 104 to prevent premature oxidation of the cations and $NaNO_2$. Pumps 108, draw stock solution at a predetermined rate from each container 102, 104 (preferably 50–60 ml/min). This may be accomplished, for example, with a gear pump and 0.125" diameter polypropylene tubing. Each solution is preferably preheated, for example, to about 96° C., prior to atomization and deposition. The solutions may flow through a coil 112, for example a 4" diameter×14 turn coil of polypropylene, in a constant temperature bath 110 to effectuate preheating. The dwell time of the stock solutions through each coil should be sufficient to raise the liquid temperature to that of the bath. The solutions continue their journey to the atomizing spray nozzles 114. Nozzles 114 may be ultrasonically driven with adjustable power supplies 116 and may be placed in prepositioned holes in a 0.750" thick Teflon lid 118. The higher the power level, the finer the spray. The lid seals the top of a reactor 120, for example of Pyrex®, within which deposition takes place. Additional holes may be provisioned for a spindle axle 124 and a thermocouple 122. A hot plate 128 may be used to heat reactor 120, and the preferably variable speed, rotating spindle 126 to the operating temperature (96° C. for example). The water may be heated to temperature with a programmable stirring hot plate 128 and maintained with control thermocouple 122. One or more outlet ports 130 in reactor 120 may be provided to maintain the liquid level during deposition and to drain the system upon completion.

In an exemplary embodiment of the invention, spindle 126 is a 5" diameter by 1.5" thick aluminum alloy cylinder with a 0.375" diameter×18" long stainless steel shaft extending from the upper surface.

In opposing positions and preferably about 0.250" in from the edge of the spindle, magnets 132 are inserted in or on the spindle. The magnets may be, for example, samarium-cobalt bar magnets. Preferably magnets 132 are inserted into wells within the spindle. One magnetic field is aligned parallel to the surface of spindle 126 and radially to the axis of spindle 126. The field of the opposite site is parallel to the surface of spindle 126 and circumferential (90°) to the axis. In addition, two magnets may be installed 90° to the first magnets. One inch diameter magnets are suitable for the apparatus described in this paragraph. The fields of these additional magnets are preferably perpendicular to the spindle surface and are preferably rare earth magnets. The magnetic fields introduce anisotropy in the magnetic properties of the ferrite film. Any number and position of magnets may be used, provided that the desired fields are produced.

The strength of the magnetic field is preferably in the range of about 100 G to about 1500 G, and more preferably in the range of about 100 G to about 300 G. Magnets may be permanent magnets or electromagnets. The magnetic field is preferably in the plane of substrates 134, but may be tilted with respect to that plane. In general, magnets may be placed anywhere that produces the desired magnetic field.

To begin a deposition run, substrates 134 are mounted on the upper surface of spindle 126, for example, with double-sided masking tape and spring clamps. Spindle 126 is positioned in water bath 124 of the reactor 120 such that the upper surface of spindle 126 is above the water level, preferably by about 0.125 to 0.250". The Teflon lid 118 is put into place. The rpm of spindle 126 is set and rotation initiated. Preferably the rotational speed is in the range of about 100 to about 3000 rpm, and more preferably in the range of about 800 rpm to about 2000 rpm. However, the speed may be higher than this range. Typically, higher rpm yield better quality films, for example by increasing smoothness.

The constant temperature bath 110 and liquid 124 in reactor 120 are heated to temperature and the power to pumps 108 and spray nozzles 114 turned on, preferably simultaneously. Thus, substrate 134, as it rotates on spindle 126, is exposed to alternating sprays of oxidizer and cation solutions. Spacing between nozzles 114 and the distance between the bottom of the nozzle and the substrate surface are critical parameters. Preferably, nozzles 114 are placed directly over substrates 134, and the distance between nozzles 114 and the surface of substrates 134 is in the range of about 35 $\mu$m to about 200 $\mu$m. Typically, the deposition time for an approximately 6 $\mu$m thick film at 800 rpm is 150 minutes.

The spin spray method is compatible with silicon technology, however there is a considerable mismatch between the coefficient of thermal expansion of the ferrite ($\sim 9\times 10-6$ $\Delta L/L/°$ C.) and that of the underlying Si($\sim 3\times 10-6\Delta L/L/°$ C.). Mismatch may be overcome with appropriate intermediate layers between the ferrite and the substrate.

Advantageously, embodiments of the invention allow use of intermediate layers to promote adhesion between the substrate and ferrite film. Use of such intermediate layers would not be possible in conventional ferrite film formation techniques because of high temperatures necessary in those methods. Embodiments of the invention include intermediate layers comprising a material having end groups orientated with respect to the intermediate layer surface on which the ferrite is deposited such that bonding of the ferrite to the intermediate layer is promoted. In an illustrative embodiment of the invention the intermediate layer is a SAM having a thiol end group. In addition to embodiments described in the experimental examples, SAMs may be employed having longer hydrocarbon chains and/or alcohol end groups.

Anisotropy may be increased by annealing the ferrite film after its formation Annealing after doping also increases anisotropy. In an exemplary embodiment the ferrite film is annealed at a temperature in the range of about 150° to 400° C. The experimental example provided introduction of Co to improve anisotropy in the presence of a bias field. Subsequent treatments of films incorporating Co may further increase the uniaxial anisotropy. Furthermore, materials other than Co may be used for initial and subsequent treatments, for example Cu, Mg, Li. In an illustrative embodiment, the ferrite film is doped from about 0.01 weight percent to about 5.0 weight percent. In another illustrative embodiment, the doping range is about 0.2 weight percent to about 0.5 weight percent.

The coercivity of ferrite films formed according to embodiments of the invention may be greater than that of ferrite formed according to conventional methods, due to greater anisotropy. An illustrative range of coercivity for ferrite films formed according to embodiments of the invention is about 10 Oe to about 200 Oe, with an exemplary range of about 40 Oe to about 60 Oe. An illustrative range of the ferrite film anisotropy is about 1000 dyn-cm/$cm^3$ to about $2\times 10^6$ dyn-cm/$cm^3$.

An illustrative thickness range of the ferrite film is about 0.5 μm to about 8 μm. A second illustrative thickness range is about 1 μm to about 5 μm.

Following are experimental examples that contain parameters for illustrative embodiments of the invention. The invention, however, is not limited to the particular parameters set forth in the experimental examples.

Analytical Methods

Phase formation and crystallinity of deposited films were studied by X-ray diffraction using a Philips Xray Diffractometer model XRG 3100. The incident x-ray beam was Cu Kα with a wavelength of 1.54178 Å. Samples were analyzed at 2θ from 10–90° at intervals of 0.05° with a sampling time of 1.5 seconds. The morphology, microstructure, and film thickness were examined using a Leo FE-SEM model 1530. Evaluation of the film topography and surface roughness (RMS) was performed on an Explorer Atomic Force Microscope (AFM) from Topometrix. Three different (50 μm×50 μm) areas were analyzed. The scan speed of the tip was 100 μm/sec and the resolution was set at 200 pixels per line, yielding an equivalent lateral resolution of ¼ μm. The obtained image was analyzed using software provided by the vendor (SPMLab Version 4.0), which automatically calculates the surface roughness either as an Area Ra or Area RMS.

Quasi-static M-H loops were obtained using a vibrating sample magnetometer (VSM) calibrated with a Ni standard. In-plane anisotropy was evaluated using an automated routine to measure remanence as a function of azimuthal angle. Once the easy and hard axes were identified, in-plane M-H loops were measured along these two directions, typically over the field range −200-200 Oe. As expected, the magnetic easy axis was found to be parallel to the magnetic bias field applied during growth.

Permeability spectra were obtained using a single-loop permeameter with an HP8753E network analyzer over a frequency range of 3 MHz–3 GHz.

Experimental Ferrite Layer Growth

A spin-spray method was used to plate Ni—Zn—Fe—O films on alumina substrates. Films with thickness over 5 μm were made by spraying the metal and oxidizer solutions at rates of approximately 60 ml/min. The major plating conditions were:

| | |
|---|---|
| Substrate spinning rate: | 180 RPM, |
| Water stirrer rate: | 150 RPM |
| Water Temp. set point: | 98° C. |
| Bath preheated set point: | 98° C. |

Films were grown in a magnetic field by placing the substrate over permanent magnets so that the field lines were parallel to the film surface. This growth was shown to enhance the anisotropy in the final films as compared to films grown without the presence of a magnetic field. Introducing Co into the film further enhanced the anisotropy. Finally, annealing the films at 200° C. also contributed to the increased anisotropy in the final films. The FMR for doped then annealed films, wherein the films were annealed in a magnetic field, was greater than about 2 GHz. Undoped films had FMRs of less than about 300 MHz.

Silicon substrates were also used. In some runs a self-assembled monolayer (SAM) layer having an anchoring group at its base and a functional group at one end was employed to improve adhesion between the ferrite layer and the silicon substrate. The compound $H_2N(CH_2)_3Si(OCH_3)_3$, where the alkoxides give off alcohols forming R—Si—O— surface bonds that anchor the molecules to the surface, was tested. The amine end group is hydrophilic and can form a good base for the ferrite layer. Experiments showed that coatings with this particular SAM increases considerably the adhesion of the ferrite layer on the Si substrate In other runs a silica sol-gel layer was introduced on the silicon substrate to promote adherence of the ferrite layer. The smoothness and uniformity of resulting ferrite film was improved by increasing the spinning rate of the samples from 180 RPM to 800 RPM.

Experimental Ferrite Layer Structure

Films deposited at low temperatures (<100° C.) were polycrystalline. All films had a spinel structure, however, films deposited onto amorphous silica substrates tended to have a preferred orientation in the (111) plane while those deposited onto $Al_2O_3$ were randomly oriented. All films had a columnar structure. The film thickness was determined by the deposition time and conditions and films from 1–7 μm thick were fabricated. The crystallite size was approximately 50 nm. The surface roughness was measured by contact AFM. Films, with an average thickness of 3.4 μm, had an RMS of 393 nm and Ra of 319 nm.

Magnetic Properties of the Experimental Ferrite Layer

The films were found to be magnetically soft, with a large saturation magnetization (4πM~5000–6000 G), low coercive force (Hc~15–50 Oe), and a small field required to achieve complete saturation (Hs~50–200 Oe). The properties were closer to those of bulk ferrites sintered at 1200–1300° C. (Hc~50–200 Oe,Hs~1 Oe) than to those of thin-film ferrites prepared by physical vapor deposition at modest temperatures (Hc~100 Oe, Hs~100–400 kOe). For the case where the applied field is applied parallel to the plane of the film, the M-H loop for $(Ni,Zn)Fe_2O_4$ is characteristic of a soft magnetic material although the approach to saturation is more gradual than would be obtained in an ideal material. In the case where the field is applied perpendicular to the plane of the film, the loop is skewed due to demagnetization.

Figure 2:
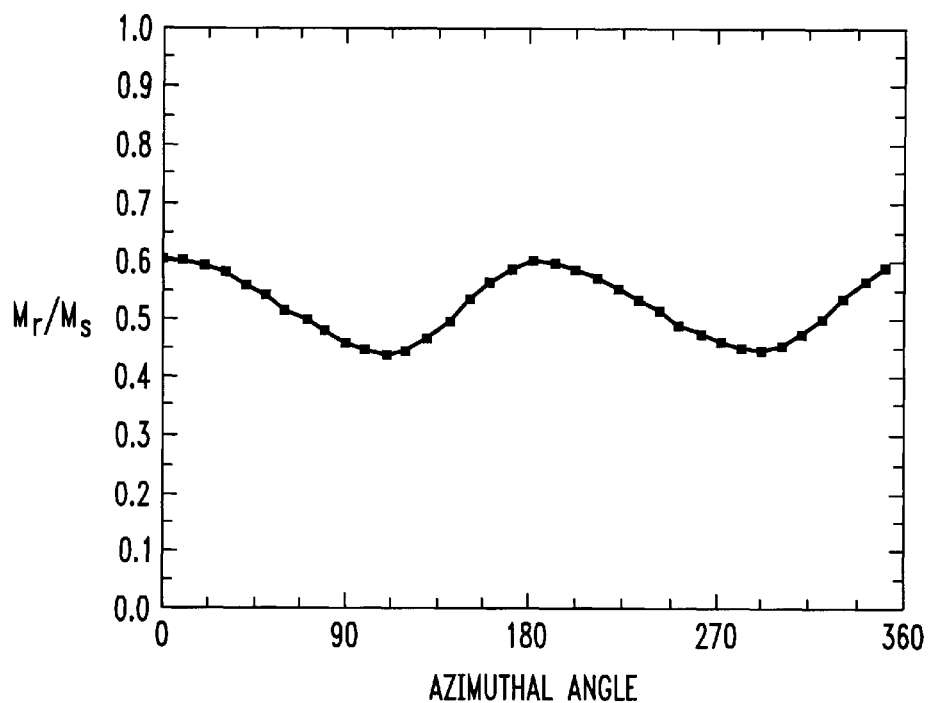
FIG. 2 is the remanence of a Co-doped ferrite film formed without a bias field plotted versus azimuthal angle.
Figure 3:
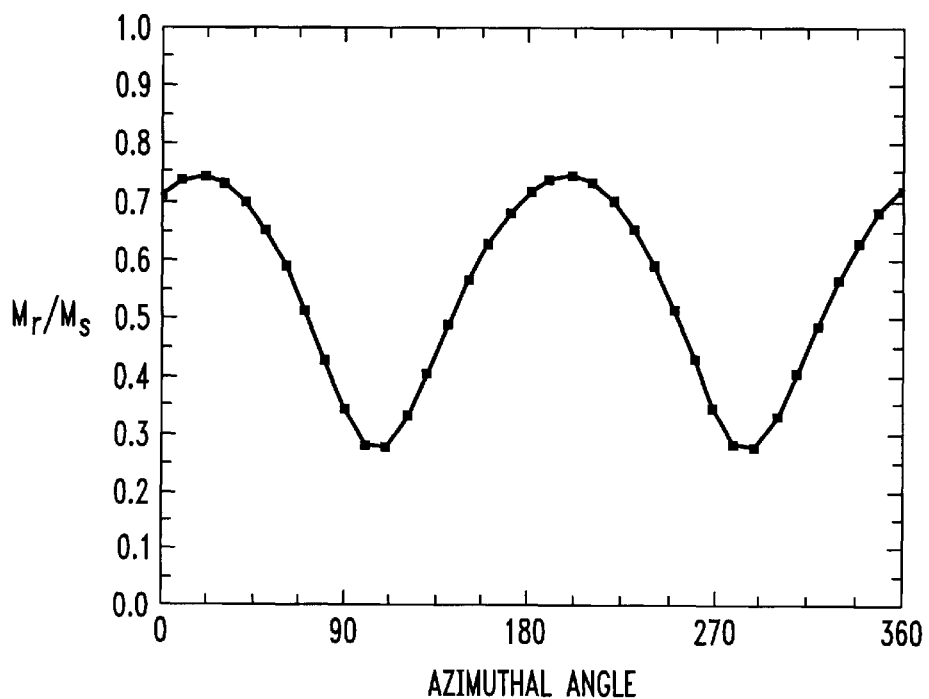
FIG. 3 is the remanence of a ferrite film formed while exposed to an alnico plate magnet plotted versus azimuthal angle.

The symmetry of the magnetic anisotropy of the films was evaluated using quasistatic M-H loops. The azimuthal variation of the remanence (magnetization at zero field, measured after first applying a field sufficient to saturate the sample) is directly indicative of the in-plane anisotropy magnitude and symmetry. FIG. 2 shows the remanence variation of a Co-doped film on an alumina substrate with no anneal and no bias field applied during deposition. Little in-plane anisotropy is shown for this sample. The normalized remanence, M(H=0)/M(H=300 Oe) shows only a small variation as a function of the direction of applied field, and a variation is not symmetric (i.e., the hardest and easiest directions are not 90° apart). FIG. 3 shows the remanence variation of a Co-doped film on an alumina substrate with no anneal wherein the sample was resting on an alnico plate magnet during deposition. A more substantial anisotropy was observed with this sample.

The experimental examples provide illustrative parameters and characteristics of the ferrite film formation method, materials and apparatus according to illustrative embodiments of the invention. Embodiments of the invention, however, are not limited to that which is described in the examples.

While the invention has been described by illustrative embodiments, additional advantages and modifications will occur to those skilled in the art. Therefore, the invention in its broader aspects is not limited to specific details shown and described herein. Modifications, for example, to the ferrite layer composition, magnetic field strength and orientation, and to the ferrite layer deposition method, may be made without departing from the spirit and scope of the invention. Accordingly, it is intended that the invention not be limited to the specific illustrative embodiments but be interpreted within the full spirit and scope of the appended claims and their equivalents.

What is claimed is:

1. A method of depositing a ferrite film comprising spraying an oxidizing solution and a chloride solution including metal cations on a substrate while the substrate is exposed to a magnetic field.

2. The method of claim 1 wherein the substrate is spinning during deposition of the ferrite.

3. The method of claim 2 wherein the spinning rate is in the range of about 500 rpm to about 900 rpm.

4. The method of claim 1 wherein the magnetic field is created by one or more magnets positioned to create a field in the plane of the substrate.

5. The method of claim 1 wherein the deposited ferrite has a ferromagnetic resonance in the range of about 1 GHz to about 3 GHz.

6. The method of claim 5 wherein the deposited ferrite has a ferromagnetic resonance in the range of about 1 GHz to about 2 GHz.

7. The method of claim 1 further comprising forming an intermediate layer between the substrate and the ferrite.

8. The method of claim 7 wherein the intermediate layer is a self-assembled monolayer.

9. The method of claim 8 wherein the self-assembled monolayer has a thiol end group.

10. The method of claim 7 wherein the intermediate layer is $H_2N(CFI_2)_3Si(OCH_3)_3$.

11. The method of claim 7 wherein the intermediate layer is a sol-gel.

12. The method of claim 7 wherein end groups of the intermediate layer material are orientated with respect to the intermediate layer surface on which the ferrite is deposited such that bonding of the ferrite to the intermediate layer is promoted.

13. The method of claim 7 wherein the intermediate layer comprises an oring group and a functional group.

14. The method of claim 13 wherein the anchoring group is an alkoxide.

15. The method of claim 13 wherein the functional group is hydrophilic.

16. The method of claim 1 further comprising doping the ferrite layer with a material selected from the group consisting of cobalt, copper, lithium and magnesium.

17. The method of claim 1 wherein the ferrite deposition is performed at a temperature less than about 300° C.

18. The method of claim 1 wherein the ferrite deposition is performed at a temperature less than about 100° C.

19. The method of claim 1 wherein the ferrite is deposited to a thickness of about 1 $\mu$m to about 10 $\mu$m.

20. The method of claim 1 wherein the magnetic field lines are substantially parallel to the ferrite surface.

21. The method of claim 1 further comprising annealing the ferrite film.

22. The method of claim 21 wherein the ferrite film is annealed at a temperature in the range of about 150° C to about 400° C.

23. The method of claim 1 wherein the coercivity is in the range of about 10 Oe to about 200 Oe.

24. The method of claim 1 wherein the uniaxial in-plane anisotropy of the ferrite film is in the range of about 1000 dyn-cm/cm$^3$ to about 2×106 dyn-cm/cm$^3$.

25. The method of claim 1 further comprising doping the ferrite film with zinc.

* * * * *